United States Patent [19]
Krishnan

[11] Patent Number: 5,283,112
[45] Date of Patent: Feb. 1, 1994

[54] WATERPROOF BREATHABLE FABRIC LAMINATES AND METHOD FOR PRODUCING SAME

[75] Inventor: Sundaram Krishnan, Stoneham, Mass.

[73] Assignee: Surface Coatings, Inc., Wilmington, Mass.

[21] Appl. No.: 97,363

[22] Filed: Jul. 26, 1993

Related U.S. Application Data

[60] Division of Ser. No. 968,182, Oct. 29, 1992, Pat. No. 5,234,525, which is a continuation of Ser. No. 914,871, Jul. 16, 1992, Pat. No. 5,208,313.

[51] Int. Cl.$^5$ ............................................. B32B 9/00
[52] U.S. Cl. ................................... 428/261; 428/286; 521/155; 521/154; 528/28; 96/12
[58] Field of Search .......... 428/261, 286; 528/28; 521/155; 55/158

[56] References Cited

U.S. PATENT DOCUMENTS

| | | | |
|---|---|---|---|
| 3,953,566 | 4/1976 | Gore | 264/288 |
| 4,187,390 | 2/1980 | Gore | 174/102 R |
| 4,194,041 | 3/1980 | Gore et al. | 428/315 |
| 4,344,999 | 8/1982 | Gohlke | 428/212 |
| 4,443,511 | 4/1984 | Worden et al. | 428/198 |
| 4,532,316 | 7/1985 | Henn | 528/59 |
| 4,816,328 | 3/1989 | Saville et al. | 428/246 |
| 4,868,928 | 9/1989 | Norvell | 2/272 |
| 4,925,732 | 5/1990 | Driskell et al. | 428/336 |
| 4,942,214 | 7/1990 | Sakhpara | 528/59 |
| 4,961,985 | 10/1990 | Henn et al. | 428/196 |

*Primary Examiner*—Morton Foelak
*Attorney, Agent, or Firm*—Barry R. Blaker

[57] ABSTRACT

Disclosed herein are polyurethane compositions specifically adapted to produce non-porous membranes exhibiting waterproof and water vapor transmissible characteristics. The membranes can be produced as free standing products or can be produced as coatings on porous substrates to confer similar properties to such substrates. Also disclosed are coated fabrics and fabric laminates utilizing the membranous coatings of the invention and exhibiting waterproof and water vapor transmissible characteristics. Such coated fabrics and fabric laminates find utility in the fabrication of tenting, rainwear and other garments where waterproofness, coupled with breathability, are important features.

11 Claims, No Drawings

WATERPROOF BREATHABLE FABRIC LAMINATES AND METHOD FOR PRODUCING SAME

CROSS-REFERENCES TO RELATED APPLICATIONS

This application is a division of co-pending application Ser. No. 07/968,182, filed Oct. 29, 1992, to be issued on Aug. 10, 1993, under U.S. Pat. No. 5,234,525, said application Ser. No. 07/968,182 being a continuation of application Ser. No. 07/914,871, filed Jul. 16, 1992, said application Ser. No. 07/914,871 having issued on May 4, 1993, under U.S. Pat. No. 5,208,313.

FIELD OF THE INVENTION

The present invention relates generally to waterproof breathable polyurethane membranes, to a coating method and system for producing same on porous substrates and to waterproof breathable porous substrates, particularly fabrics, comprising such membranes.

BACKGROUND OF THE INVENTION

A well known waterproof breathable textile laminate of commerce, sold under the brandname, GORE-TEX, is technically based upon the use of a membrane of hydrophobic, microporous, expanded polytetrafluoroethylene (hereinafter "PTFE") as an essential functional component thereof. For most purposes, the microporous PTFE membrane of the laminate is sandwiched between inner and outer fabric layers, the membrane generally, although not necessarily, being continuously bonded and/or adhered to one or both fabric layers. Such hydrophobic microporous PTFE membranes and the preparation thereof are described in U.S. Pat. Nos. 3,953,566, Robert W. Gore, issued Apr. 27, 1976 and 4,187,390, Robert W. Gore, issued Feb. 8, 1980. The preparative method broadly comprises the uniaxial or biaxial stretching of an unsintered highly crystalline PTFE sheet, prepared by paste extrusion, at a rate exceeding 10% per second while maintaining the temperature thereof at between about 35° C. and the crystalline melt point of the polymer. The resulting membranous PTFE product of this process has a microstructure characterized by nodes interconnected by fibrils and is possessed of an interesting and useful combination of properties which befits it for use in the preparation of waterproof breathable textile systems. More specifically, the hydrophobic, microporous, expanded PTFE membranes of the above Gore patents are sufficiently hydrophobic and the micropores small enough such that the membrane can function as a barrier to the passage of bulk water therethrough at significant hydrostatic pressures. On the other hand, due to the microporous character thereof, said membranes also possess the capacity to allow diffusion of water vapor therethrough. Thus, these desirable properties of waterproofness and water vapor transmissibility or "breathability" are imparted to textile laminates in which such a membrane comprises a component layer.

Despite its relative success in the marketplace, the waterproof breathable textile laminate systems based on the hydrophobic microporous expanded PTFE membrane of the above-identified Gore patents are, nevertheless, possessed of certain deficiencies. Firstly, such expanded PTFE membranes are relatively expensive. Secondly, because waterproof breathable textile laminates utilizing such microporous expanded PTFE membranes are necessarily constructed by some form of physical lamination of the previously prepared PTFE membrane to at least one previously prepared fabric layer, equipment and operative techniques must be provided to handle the membrane and the fabric, to properly index them and to secure the PTFE membrane layer to the fabric layer. Thus, the techniques used to prepare such laminates are generally substantially more complex, arduous and expensive as compared to conventional liquid coating and curing techniques known in the fabric coating art. Thirdly, PTFE materials are generally known to be of adhesion resistance character. Therefore, where it is desired to prepare a waterproof breathable textile laminate by means of a continuous bonding of the PTFE membrane layer to a fabric layer, such as by interposition of a continuous adhesive layer between the microporous expanded PTFE membrane layer and the fabric layer, the resulting bond strength, albeit usually adequate, is generally relatively low and the selection of a suitable adhesive which can accomplish the necessary bonding without substantial adverse affect upon the breathability of the system can be a problem. Another problem associated with the use of the microporous expanded PTFE membranes in textile laminate systems resides in the finding that such membranes, over a period of use, can crack sufficiently as to provide sites for bulk water leakage or seepage therethrough. Apparently, the many micropores necessarily embodied in the polymer matrix can act as crack propogation loci and this, coupled with the crystalline nature of the polymer, result in a membrane whose flexure life is somewhat limited. Finally, the expanded microporous membranes of the above-identified Gore patent are apparently susceptible to significant loss of their waterproof characteristics when contacted with such surface active agents as are inherently contained in human perspiration. Obviously, this can be a serious detriment where textile laminates employing these membranes are employed as garment materials. This problem, as well as a solution therefor, is disclosed in U.S. Pat. No. 4,194,041, Gore et al., issued Mar. 18, 1980. The solution therein disclosed resides in the interposition of a continuous, hydrophilic, water vapor transmissible layer between the microporous hydrophobic membrane surface and the surfactant source. Thus, with respect to garments fabricated with a waterproof breathable textile laminate prepared in accordance with the aforementioned Gore et al. patent, the microporous hydrophobic membrane layer faces the exterior of the garment while the continuous hydrophilic layer faces the interior of the garment. In this role, the continuous hydrophilic layer functions as a barrier to the surfactant contaminants in human perspiration and prevents contact thereof with the hydrophobic microporous PTFE membrane, thereby to preserve the waterproof character of the membrane. As disclosed, the continuous hydrophilic layer of the construction can be in the nature of a hydrophilic polyurethane based on a reactive crosslinkable prepolymer having an isocyanate terminated branched polyoxyethylene backbone. Attachment of the continuous hydrophilic layer to the microporous hydrophobic membrane can be discontinuous, such as in the nature of sewing or adhering together of the edges of the respective layers by thread or adhesive. The use of a continuous adhesive bond between the hydrophobic and hydrophilic layers is apparently believed by the patentees to be potentially detrimental to the water vapor transmission properties of the laminate and so is not discussed or disclosed. Where continuous bonding of the respective layers of the laminate is desired, patentees disclose a technique whereby direct bonding of the one layer to the other is achieved. Said technique involves the casting of the hydrophilic layer directly onto the surface of the microporous hydrophobic membrane layer with application of sufficient hydraulic pressure as to force the hydrophilic layer into the surface voids of the hydrophobic layer. Thus, while the Gore et al. patent may provide a second generation solution for the surfactant contamination problem disclosed to exist with respect to garment applications involving the first generation hydrophobic microporous expanded PTFE membranes disclosed in U.S. Pat. Nos. 3,953,566 and 4,187,390, it is obvious that the solution is achieved at the expense of added complexity and, of course, cost.

In U.S. Pat. No. 4,532,316, Robert L. Henn, issued Jul. 30, 1985, there is generally disclosed a phase separated polyurethane prepolymer having hard and soft segments and elastomers prepared therewith. The prepolymer comprises the product of reaction of (a) a polyol having a number average molecular weight of between 600 and 3500, (b) a polyisocyanate having a functionality of at least 2, and (c) a chain extender having a molecular weight of no greater than 500, these components of the prepolymer being present within a specified range of proportions. It is further disclosed that, where the polyol component employed is poly(oxyethylene) glycol, the prepolymer can be formed into cured films having superior moisture vapor transmission properties and that such prepolymer can thus be formed as a composite with various textiles for use in rain protective garments. Example 10 of the patent discloses the preparation of breathable coated textiles by melt coating of a fabric with poly(oxyethylene) glycol based prepolymers prepared in accordance with the invention followed by moisture curing of the coating. Said breathable coated textiles were found to be durably waterproof under scoring and flexing tests and were stated by patentee as being suitable for use in rain protective wear. In Example 11, a hydrophilic phase separated non-porous film of hydrophilic polyurethane was directly bonded to an expanded PTFE membrane in the manner of the aforementioned U.S. Pat. No. 4,194,041. A poly(oxyethylene) glycol based prepolymer different from those employed in Example 10 was utilized and roll coated onto the PTFE membrane under pressure, followed by ambient moisture curing of the coating. The resulting PTFE/polyurethane composite was discontinuously adhered to a textile fabric to form a breathable textile laminate, the PTFE layer being being sandwiched between the fabric and polyurethane layers. The patentee discloses this textile construction as being suitable for the fabrication of excellent rain protective wear therefrom. From the disclosure it is suggested that Henn regards the attainment of acceptable moisture vapor transmissions rate for clothing purposes as being absolutely dependent upon the use of a poly(oxyethylene) glycol based prepolymer and, to a lesser extent, upon the extent of phase separation attained between the hard and soft segments of the cured polymer.

In accordance with the present invention there is provided a waterproof breathable polyurethane membrane whose waterproofness and breathability properties are not dependent upon the presence of microporosity and in which at least several of the problems related to the known microporous membranes of the prior art have been solved or substantially ameliorated. In another aspect of the invention, the polyurethane membranes hereof are disposed over porous substrates, particularly as coatings applied to fabrics, thereby to confer waterproofness and breathability to such substrates,

OBJECTS OF THE INVENTION

It is a principal object of the invention to provide a novel polyurethane composition which, in non-porous membranous form, is waterproof and water vapor transmissible.

It is another object of the invention to provide a novel non-porous polyurethane membrane which is waterproof and water vapor transmissible.

It is another object of the invention to provide the novel non-porous, waterproof and water vapor transmissible polyurethane membrane hereof in the form of an adherent coating.

It is another object of the invention to provide porous material substrates to which waterproof and water vapor transmissive properties have been conferred by disposition of the polyurethane membrane of the invention thereover.

It is still another object of the invention to provide a novel waterproof and water vapor transmissible coated fabric.

It is another object of the invention to provide a novel waterproof and water vapor transmissible textile laminate construction.

It is yet another object of the invention to provide a novel solvent based polyurethane coating system whereby porous material substrates, such as fabrics, may be rendered waterproof and water vapor transmissible by conventional coating techniques.

Other objects and advantages of the present invention will in part be obvious and will in part appear hereinafter.

SUMMARY OF THE INVENTION

The polyurethane membrane of the invention is a cured polyurethane film arising as a reaction product of: (a) an organic polyisocyanate, (b) a polyalkylene ether glycol wherein the number of carbon atoms of the alkylene radical is 2, in other words a poly(oxyethylene) glycol, (c) at least one polyalkylene ether glycol wherein the number of carbon atoms defining the alkylene radical is at least 3, and (d) a reactive hydroxy group-containing polydimethylsiloxane having a functionality of at least 2. The mole ratio of the polyalkylene ether glycol of (a) to the polyalkylene ether glycol of (b) can be within the range of 1.5:0.5 to 0.5:1.5. The mole ratio of the reactive polydimethylsiloxane of (d) to the total glycols of (b) and (c) can be within the ranges of 0.1:1 to about 0.3:1. The polyurethane composition can be prepared utilizing the well known prepolymer or one-shot routes although, in applicant's belief the prepolymer route is more versatile and is, therefore, preferred. Utilizing the prepolymer route, a single NCO-terminated prepolymer can be prepared bearing the compositional requirements set forth above and then chain extended to provide a curable composition suitable for preparation of the cured membrane of the invention. Alternatively, two NCO- terminated prepolymers can be separately prepared, each prepolymer chain extended and the chain extended prepolymers blended in the appropriate amounts prior to or during formation of the membrane and prior to curing thereof. Using this scheme the first prepolymer is formed from the polyethylene glycol and reactive hydroxyl group-containing polydimethylsiloxane to form an isocyanate terminated random block urethane copolymer of polyethylene oxide and polydimethylsiloxane. The second prepolymer is performed from the polyoxyalkylene glycol(s) of (c). Each of these prepolymers is chain extended in the conventional manner, utilizing low molecular weight chain extenders having terminal labile hydrogen atoms. These chain extended prepolymers may then be suitably blended in the amounts required to bring the blended composition within the foregoing combination of compositional parameters prior to or during formation of the membrane and at any time prior to curing thereof. A particularly flexible system for accomplishing the blending of the chain extended prepolymers resides in preparing separate solutions thereof in inert fugitive solvents, coating the surface of a porous substrate desired to be rendered waterproof with the first (block copolymer) extended prepolymer solution and driving off the solvent therefrom, overcoating the dried, uncured first coating with the second extended prepolymer solution, thereby to cause diffusion of at least a portion of said second prepolymer solution into the dried uncured first coating, driving off the solvent, and curing the resulting membranous coating.

The cured non-porous polyurethane membranes of the invention may be prepared separate and apart from the porous substrate over which they may ultimately be disposed, such as by forming of the uncured membrane on a release surface followed by curing thereof. Moreover, the membranes of the invention can be disposed over a porous substrate to render same waterproof and water vapor transmissive in any suitable manner, such as by discontinuously securing the membrane to the substrate surface using mechanical securing elements. However, it is much preferred that the membrane be continuously bonded to the substrate surface, and this can generally be achieved by a direct solution coating technique such as outlined above and/or by adhering the membrane to the substrate surface by means of a compatible continuous water vapor transmissible adhesive interposed between the substrate surface and the membrane of the invention.

Many porous articles, such as woven and non-woven fabrics, natural and poromeric artificial leathers, papers and ceramics can be rendered waterproof and water vapor transmissible by disposition of the membranes of the invention thereover. The direct solution coating and continuous adhesive techniques mentioned above are particularly amenable to the preparation of waterproof and water vapor transmissible fabrics and fabric laminates utilizing the membranes of the invention.

DESCRIPTION OF PREFERRED EMBODIMENTS

Utilizing the preferred prepolymer route for preparing the polyurethane membranes of the invention, the prepolymers are produced in accordance with conventional methodology whereby the polyols and reactive polydimethylsiloxane are reacted with a stoichiometric excess of the polyisocyanate and the resulting isocyanate terminated prepolymer is then reacted with a relatively low molecular weight difunctional chain extender.

Polyalkylene ether glycols generally suitable for preparation of the prepolymers of the invention are those known in the polyurethane preparative art. The polyalkylene ether glycols of interest are generally those prepared from ethylene oxide (polyoxyethylene glycol), propylene oxide (polyoxypropylene glycol), butylene oxide (polyoxybutylene glycol), copolymers and mixtures thereof and preferably have average molecular weights of between about 450 and 2000 since such glycols are either liquids at room temperature or may be readily liguified by mild heating thereof. I generally prefer that the starting material polyalkylene ether glycols employed by difunctional, that is to say having a functionality of 2. Where a prepolymer of the invention is prepared from polyalkylene ether glycols have functionalities of substantially greater than 2, for instance 2.2 or greater, the resulting polyurethane prepolymers tend to be excessively branched, thereby to exhibit viscosities which are excessive for further polymer preparation and handling.

It is known that non-porous hydrophilic breathable polyurethane coatings and membranes can be produced utilizing polyoxyethylene glycols as the primary polyol. However, hydrophilic polyurethanes whose backbones are composed entirely or nearly entirely of ethylene oxide units tend to swell greatly upon contact with water and the wet physical properties of such polyurethanes are generally wholly inadequate for practical use as membranous breathable waterproofing materials. In the present invention, the polyalkylene ether glycol(s) used in combination with the poly(oxyethylene) glycol, that is to say, those polyalkylene ether glycols wherein the number of carbon atoms of the alkylene radical is at least 3, serve to confer sufficient wet strength properties to the cured polyurethane composition as to permit the practical use thereof in the form of a breathable waterproofing membrane. In order to assure this result, the molar ratio of the poly(oxyethylene) glycol to the other polyalkylene ether glycols in the compositions of the present invention should be within the range of 1.5:0.5 to 0.5:1.5 and is preferably about 1:1. In general, it can be said that, all other factors being equal, the higher the molar ratio of the poly(oxyethylene) glycol component to the other polyalkylene ether glycol(s) in the composition, the greater the water vapor transmission properties and the lower the wet physical properties in a cured membrane prepared therewith. Conversely, the lower the molar ratio of the poly(oxyethylene) glycol component to the other polyalkylene ether glycols in the composition, the lesser the water vapor transmission properties and the higher the wet physical properties in a cured membrane prepared therewith. Indeed, based on the relatively high concentration of the polyalkylene ether glycol component whose alkylene groups comprise at least 3 carbon atoms in the compositions of the invention, it would be predicted that the water vapor transmission rates attainable in cured membranes prepared therewith would be too low for practical utility, particularly in such textile applications as rainwear fabrics where a moisture (or water) vapor transmission rate as determined by the Upright Cup Test Method of ASTM-E96-B 66B, hereinafter referred to as "MVTR", of at least 500 gms/m$^2$/24 hours is considered necessary for maintaining the comfort of a wearer of a garment manufactured from the fabric. In the membrane compositions of the invention the attainment of MVTR values of at least 500 gms/m$^2$/24 hours and substantially higher in the cured membrane is markedly facilitated, despite the relatively high concentration of the $C_3$ and higher polyalkylene ether glycol component, by the additional presence of a relatively minor proportion of a reactive polydimethylsiloxane component which apparently forms a hydrophobic, water vapor transmissive block in the polymer backbone of the cured composition.

The reactive polydimethylsiloxane starting materials of interest are those which comprise a linear or lightly branched polydimethylsiloxane backbone and which further comprise at least two reactive, usually terminal, hydroxyl groups per molecule, that is to say, a functionality of at least 2. Such reactive polydimethylsiloxanes are commercially available in various average molecular weight fractions from such sources as Dow Chemical Company, Midland, Michi. and General Electric Company, Silicones Division, Schenectady, N.Y. In general, I prefer that the average molecular weight of the reactive polydimethylsiloxane utilized as a starting material in the preparation of the polyurethane compositions of the invention reside within the range of from 800 to 3500. As previously mentioned, the mole ratio of the reactive polydimethylsiloxane to the total polyalkylene ether glycol content of the final composition should be within the range of 0.1:1 to 0.3:1. Generally speaking, all other factors being equal, the higher the mole ratio of the reactive polydimethylsiloxane within the foregoing range the greater will be the MVTR values attainable in the cured polyurethane membranes prepared therewith.

Polyisocyanates useful in the preparation of the polyurethane compositions of the invention generally include any of the diisocyanates conventionally employed in the preparation of polyurethanes. Exemplary of these are: toluene diisocyanate, diphenylmethane diisocyanate, napththalene diisocyanate, isophorone diisocyanate, dicyclohexylmethane diisocyanate, dimethoxydiphenyl diisocyanate, p-xylene diisocyanate, hexamethylene diisocyanate, tetramethylxylene diisocyanate and the like. Where the preferred prepolymer route is employed, and as is known practice in the preparation of polyurethane prepolymers, the quantity of the polyisocyanate employed in preparing the prepolymer is in stoichiometric excess relative to the reactive hydroxyl group population of the polyalkylene ether glycol and reactive polydimethylsiloxane components, thereby to ensure that the resulting prepolymer macromolecular product will be terminated with reactive -NCO groups. Thus, the quantity of the polyisocyanate employed in the preparation of the prepolymers of the invention will be sufficient to provide at least 100% of the -NCO groups necessary to react with the hydroxyl groups of the polyalkylene ether glycols and reactive polydimethylsiloxane components of the prepolymer reaction mixture. As a matter of convenience, the amount of polyisocyanate introduced to the polyalkylene ether glycol and polydimethylsiloxane components can be sufficiently in excess to handle the needs of the subsequent chain extension of the prepolymer wherein a relatively low molecular weight bifunctional chain extender is incorporated in and reacted with the NCO-terminated prepolymer.

Suitable chain extenders are well known in the polyurethane preparative art and generally comprise organic molecules having a molecular weights of between 200 and 600 and having two terminal groups comprising labile hydrogen atoms, such as hydroxyl or amino groups. Glycols, diamines, alkanolamines and hydroxy acylamines are typical classes of such chain extenders. Specific examples are: 1,4-butanediol, phenylene diamine, ethanolamine, ethylene diamine, butane diamine, 1,4-cyclohexane dimethanol, bis(hydroxyethyl)bisphenol A, bis(2-hydroxyethyl)carbamate and the like.

In addition to the foregoing components, the polyurethane compositions of the invention may also have incorporated therein various additives and modifiers conventional in the polyurethane formulation art. Such additives and modifiers may take the form of curatives, pigments, colorants, antiblocking agents, antioxidants, catalysts, flatting agents, anticurling agents and the like. Where the prepolymer route is employed such additives and modifiers other than catalysts are usually incorporated into the polymer system only after chain extension of the prepolymer has been achieved.

The viscosity of the prepolymers of the invention and of the chain extended products thereof can range from that of a water thin liquid to the consistency of a thick, slow pouring grease or semi-solid. Generally speaking, in those instances wherein the prepolymer or chain extended polymer viscosity is likely to become excessive for subsequent operations, such as for chain extension of the prepolymer or for utilization of the chain extended polymer product in conventional textile coating techniques, such as by spraying, doctor blading, roll coating and the like, the viscosity of the prepolymer or the chain extended polymer can be readily reduced to an acceptable level by dissolution of the prepolymer or polymer in one or more suitable solvents. Indeed, as is demonstrated in certain of the working examples hereof, the viscosities of the prepolymer and chain extended polymer systems can be controlled by addition of suitable inert organic solvents to the prepolymer subsequent to its formation and by carrying out the prepolymer chain extension polymerization step in the presence of suitable inert organic solvents.

Where the membranes of the invention are to be applied to a fabric surface utilizing a solvent coating technique without lamination of the coated fabric to another fabric, it can be desirable to afford physical protection of the exposed surface of the solvent coated waterproof and water vapor transmissible polyurethane membrane by overcoating the exposed surface thereof with a protective water vapor transmissible polyurethane topcoat composition. Said topcoat composition may also be applied by a solvent coating technique to the dried, but uncured, membrane, the solvent driven off from the topcoat and the resulting composite coating cured. Where a first fabric layer is to be laminated to a second fabric layer with the cured waterproof and water vapor transmissible membrane of the invention interposed therebetween, the first of the fabric layers can be first directly coated with a precursor membrane solution comprising a chain extended polyurethane prepolymer prepared from the poly(oxyethylene) glycol and reactive polydimethylsiloxane components and the solvent driven off from this as yet compositionally incomplete coating. Then, a coating solution containing a water vapor transmissible chain extended polyurethane adhesive solute which also contains the polyalkylene ether glycol component required to complete the membrane coating is overcoated onto the precursor membrane coating and the solvent driven off therefrom. Next, the second fabric layer is brought into contact with the coated adhesive of the first fabric layer under sufficient pressure as to establish the fabric laminate structure and to cause sufficient intermingling the adhesive coating into the precursor membrane coating so as to establish in the membrane coating the compositional requirements of the invention.

There follow a number of illustrative non-limiting examples.

EXAMPLE 1

Preparation of Basecoat Formulation Urethane Chain Extended Prepolymer

The following ingredients are employed, in the stated weight percentages.

| Ingredient | Weight Percent |
|---|---|
| Isophorone diisocyanate (IPDI) | 15.786 |
| CARBOWAX 1450, a poly(oxyethylene) glycol having an average molecular weight of 1450 and a functionality of 2 (Union Carbide Corp., Danbury, CT) | 46.690 |
| Silicon Q4-3667, a polydimethylsiloxane having functional hydroxyl groups, and a functionality of about 2 (Dow Chemical Company, Midland, MI) | 7.762 |
| COSCAT 83, a catalyst (Cosan Chemcal Company, Carlstadt, NJ) | 0.024 |
| Toluol | 29.738 |

The apparatus employed to prepare the prepolymer is an assiduously predried reaction kettle equipped with heating and stirring means. At about room temperature the IPDI is first charged into the kettle and, with constant stirring, there are then slowly added at proportionate rates the poly(oxyethylene) glycol and polydimethylsiloxane. Since the poly(oxyethylene) glycol employed is a solid at room temperature it is heated to melting and charged into the kettle in the liquid state. The relative quantities of these ingredients provides a reaction mixture having a stochiometric excess of IPDI, the NCO:OH ratio thereof being about 2:1. Upon completion of the addition of the poly(oxyethylene) glycol and polydimethylsiloxane, the kettle is heated to and maintained at a temperature of 160°–180° F. Upon attainment of this goal temperature the catalyst is added and the resulting reaction mixture stirred for a period of between about 4 and 6 hours. Next, the toluol is added and stirred into the prepolymer product of reaction and the kettle cooled to below about 100° F. The reaction product is sampled and tested for free NCO and is found to have a free NCO content of about 3%, by weight. Upon analysis of the polymeric reaction product it is found that it comprises an isocyanate capped copolymer polyurethane having random polyethylene oxide and polymethyldisiloxane blocks. The prepolymer is then chain extended as follows.

Chain Extension of Prepolymer

The following ingredients are employed, in the stated weight percentages.

| Ingredient | Weight Percent |
|---|---|
| Prepolymer solution | 52.025 |
| Toluol | 11.653 |
| Methyl ethyl ketone | 12.741 |
| Isopropyl alcohol | 11.653 |
| Chain Extender (20 wt. % solution of isophorone diamine in toluol) (IPD Solution) | 11.928 |

The prepolymer mixture is charged into an assiduously predried, moisture-free stirred reaction kettle maintained at about room temperature. Next, the toluol, methyl ethyl ketone and isopropyl alcohol solvents are stirred into the prepolymer mixture in order to provide a reaction mixture having a water thin viscosity and a 35–40 wt. % prepolymer solids content. Next, the chain extender solution is trickled into the water thin reaction mixture with agitation. Over the period of the chain extender addition the viscosity of the mixture increases to between about 100,000 and 110,000 cps at 25° C. as measured with a Brookfield Viscometer using a #6 spindle at 20 revolutions per minute.

EXAMPLE 2

Preparation of Basecoat Formulation Urethane Chain Extended Prepolymer

In a stirred reaction kettle of the type utilized and in the general manner disclosed in Example 1, a prepolymer is prepared utilizing the following ingredients, in the stated weight percentages.

| Ingredient | Weight Percent |
|---|---|
| CARBOWAX 1450 | 23.335 |
| TERATHANE 2000, a polytetramethylene ether glycol having an average molecular weight of 2000 and a functionality of 2 (E. I. du Pont de Nemours, Inc., Wilmington, DE) | 32.659 |
| Isophorone diisocyanate (IPDI) | 12.096 |
| COSCAT 83 | 0.024 |
| Toluol | 31.886 |

The prepolymer reaction mixture is heated and stirred at a temperature within the range of from about 165° F. to about 180° F. for a period of about 4 hours, followed by addition of the toluol solvent and cooling of the resulting prepolymer solution to below about 100° F. Said prepolymer solution has a free NCO content of 1.42 wt. %.

Chain Extension of Prepolymer

The prepolymer of this Example is chain extended in a manner similar to that of Example 1 utilizing the following ingredients, in the stated weight percentages.

| Ingredient | Weight Percent |
|---|---|
| Prepolymer solution | 56.457 |
| Methyl ethyl ketone | 12.340 |
| Toluol | 13.266 |
| Isopropyl alcohol | 12.168 |
| Chain extender (IPD solution) | 5.767 |

Upon completion of the trickled addition of the chain extender the resulting chain extended polymer solution has a Brookfield viscosity of between 100,000 and 110,000 cps at 25° C.

EXAMPLE 3

Preparation of Thermosettable Breathable Basecoat Coating Formulation Suitable for Direct Coating of Fabrics Into a stirred kettle are mixed the following ingredients, in the stated weight percentages.

| Ingredient | Weight Percent |
|---|---|
| Chain extended polyurethane solution of Example 2 | 65.020 |
| Chain extended polyurethane solution of Example 1 | 27.821 |

-continued

| Ingredient | Weight Percent |
|---|---|
| SANTOLITE MHP, an anti-curl additive (Monanto Co., St. Louis, MO) | 2.128 |
| CYMEL 380, a melamine anti-blocking agent (American Cyanamid, Inc., Bridgeport, CN) | 3.179 |
| 20 wt. % solution of a triethylamine blocked ethyl acid phosphate catalyst dissolved in toluol | 1.852 |

This formulation, once it has been completed by incorporation of the acid catalyst therein, is in the nature of a promoted resin system which, upon long standing, ultimately thickens and gels. Accordingly, at least for direct coating applications, once the acid catalyst has been added the completed formulation should normally be utilized within about 24 hours of its preparation. The mole ratio of poly(oxyethylene) glycol (derived from the chain extended prepolymer of Example 1) to polytetramethylene ether glycol (derived from the chain extended prepolymer of Example 2) contained in this formulation is 1:1. The mold ratio of the polydimethylsiloxane constituent (derived from the prepolymer of Example 1) to the total glycols (derived from the prepolymers of Examples 1 and 2) contained in the formulation is 0.1:1.

EXAMPLE 4

Preparation of Thermosettable Breathable Basecoat Coating Formulation Suitable for the Preparation of Laminated Fabrics The following ingredients, in the stated weight percentages. are stirred in a kettle at room temperature until uniformly mixed.

| INGREDIENT | WEIGHT PERCENT |
|---|---|
| Chain extended prepolymer solution of Example 1 | 95.00 |
| CYMEL 380 melamine anti-blocking agent | 4.00 |
| Catalyt solution consisting of 40 wt. % ethyl acid phophate dissolved in toluol | 1.00 |

The resulting basecoat formulation has a Brookfield viscosity of between 30,000 and 35,000 cps at 25° F.

EXAMPLE 5

Preparation of Thermosettable Breathable Topcoat Formulation Suitable for Topcoating of Dried Basecoat of Example 3

This formulation comprises a blend of polyester and polyether chain extended urethane prepolymer solutions each of which is prepared in a manner similar to that described in previous examples. The first chain extended urethane prepolymer solution is prepared utilizing the following ingredients, in the stated weight percentages.

| 9337 Preparation of First Urethae Prepolymer Solution PREPOLYMER (1) | |
|---|---|
| INGREDIENT | WEIGHT PERCENT |
| MILLESTER VII-110, 1,4 Butandiol adipate (Polyurethane Specialties Co., Inc., Lyndhurst, NJ) | 50.099 |
| Isophorone diisocyanate | 20.291 |
| COSCAT 83 | .001173 |

-continued

| 9337 Preparation of First Urethae Prepolymer Solution PREPOLYMER (1) | |
|---|---|
| INGREDIENT | WEIGHT PERCENT |
| Butylated Hydroxy Toluene | .002346 |
| Toluol | 29.573 |

The reaction mixture, minus the toluol, is heated and stirred overnight at about 160° F. The mixture is cooled to below about 100° F. and the toluol then mixed thereinto to form a prepolymer solution.

Chain Extension of First Urethane Prepolymer

The above prepolymer solution is chain extended by addition thereto of the following ingredients, in the stated weight percentages.

| CHAIN EXTENDED PREPOLYMER (1) | |
|---|---|
| INGREDIENT | WEIGHT PERCENT |
| Prepolymer solution (1) | 39.858 |
| Toluol | 21.166 |
| Isopropyl alcohol | 28.239 |
| IPD chain extender solution | 10.737 |

As previously, the chain extender solution is trickled into the system only after the addition and admixture of the toluol and isopropyl alcohol solvents therein. The resulting chain extended polymer solution has a Brookfield viscosity within the range of 45,000–60,000 cps at 25° F. The chain extension reaction is then shortstopped or terminated with morpholine.

The second urethane prepolymer solution is prepared utilizing the following ingredients, in the stated weight percentages.

| PREPOLYMER (2) | |
|---|---|
| INGREDIENT | WEIGHT PERCENT |
| CARBOWAX 1000, a poly(oxyethylene) glycol having an average molecular weight of about 1000 | 48.467 |
| Isophoron diisocyanate | 21.483 |
| COSCAT 83 | .001189 |
| Toluol | 30.038 |

The reaction mixture, minus the toluol solvent, is heated and stirred for 3 to 4 hours at a temperature of about 180° F. Thereafter, the mixture is cooled to below about 100° F. and the toluol mixed thereinto.

Chain Extension of Second Prepolymer

Chain extension of the second prepolymer is achieved using the following ingredients, in the stated weight percentages.

| CHAIN EXTENDED PREPOLYMER (2) | |
|---|---|
| INGREDIENT | WEIGHT PERCENT |
| Prepolymer solution (2) | 45.700 |
| Toluol | 20.259 |
| Isopropyl alcohol | 19.415 |
| 20 wt. % IPD chain extender solution | 14.626 |

As previously, the IPD chain extender solution was trickled into the stirred formulation only after addition and admixing of the toluol and isopropyl alcohol solvents thereinto. The resulting chain extended prepolymer solution was then shortstopped with morpholine.

Preparation of Topcoat Formulation

The final topcoat formulation is prepared by admixing the foregoing prepolymer solutions along with additional ingredients. The ingredients of the topcoat formulation are given below in their order of mixing, along with the weight percentages thereof.

| TOPCOAT FORMULATION | |
|---|---|
| INGREDIENT | WEIGHT PERCENT |
| Chain Extended Prepolymer solution (1) | 36.819 |
| Isopropyl alcohol | 12.269 |
| Toluol | 5.724 |
| CAB 381-0.5, a cellulose acetate butyrate film hardener (Eastman Chemicals, Kingsport, TN) | 2.935 |
| Chain Extended prepolymer solution (2) | 37.731 |
| AEROSIL TS100, a hydrophobic pyrogenic silica flatting agent (Degussa, Inc., Ridgefield Park, NJ) | 2.525 |
| 50 wt. % solution of petrolatum in toluol | .396 |
| CYMEL 303 melamine anti-blocking agent | 1.071 |
| Catalyst solution consisting of 45 parts by weight of Catalyst 4040, a p-toluene sulfonic acid solution (American Cyanamid, Inc.) reduced in 55 parts by weight isopropyl alcohol | .529 |

This topcoating formulation has a Brookfield viscosity at 25° F. of between 10,000 and 15,000 cps.

EXAMPLE 6

Preparation of Breathable Thermosettable Polyurethane Adhesive Suitable for Bonding of Membrane Composed of Dried Basecoat of Example 4 to a Fabric Into a dry reaction kettle equipped with stirring, heating and cooling means there are charged the following ingredients, in the stated weights:

| INGREDIENT | WEIGHT (LBS) |
|---|---|
| TERATHANE 2000, polytetramethylene ether glycol | 23.037 |
| MONDUR M, methylene diisocyanate (Miles, Inc., Pittsburgh, PA)) | 5.799 |
| Stabilized 1,1,1-trichloroethane | 14.022 |

These ingredients are heated to about 110° F., with constant mixing, for about ½ hour at which time the heating means of the kettle is deactivated. Then, 15.024 lbs of M-Pyrol solvent (GAF chemicals Corp., Wayne, N.J.) and 0.010 lb of Fomrez C-2 tin based catalyst (Witco Chemical Corp., Chicago, Ill.) are charged into the kettle and the cooling means activated to maintain the temperature of the contents at between 115° and 120° F. for about one hour. Then, there are added to the reaction mixture 16.026 lbs of stabilized 1,1,1-trichloroethane and 1.042 lbs of 1,4-butanediol chain extender with constant mixing and maintenance of the resulting reaction mixture at a temperature of between 115° and 125° F. The Brookfield viscosity of the mixture is monitored and, upon attainment of a viscosity (at the reaction temperature) of about 80,000 cps, there is charged thereinto an additional 25.040 lbs of stabilized 1,1,1-trichloroethane and, upon completion of its admixture, the chain extension reaction is then terminated or shortstopped with methanol. The viscosity of this polyurethane solution at 25° F. is between about 100,000 and about 120,000 cps. The viscosity is reduced to about 40,000 cps by mixing the polymer solution with additional 1,1,1-trichloroethane in an 85:15 weight ratio, thereby to provide an unpromoted polyurethane adhesive formulation which, prior to use, must be admixed with a sufficiency of a polyisocyanate having a functionality of at least three in order to promote cross linking thereof.

EXAMPLE 7

Direct Coating of Fabric

Coating is achieved by a multiple serial doctor blading station apparatus comprising an elongate flat trough bed to support a textile passed therethrough and having feed and take-off ends. Preceding the feed end of the trough is a feed reel to feed a textile to be coated into the feed end of the trough. Positioned above the trough at spaced apart locations along the length thereof are three doctor blade stations, each comprising a liquid coating delivery system by which to deliver liquid coating material to the upper surface of a textile running through the trough followed by an adjustable doctor blade running across the width of the trough. Following each doctor blade station is a solvent flashing and vapor recovery station. Immediately following the take-off end of the doctor blading apparatus is a thermostatically controlled curing over having feed and take-off ends, said oven being adapted to receive into the feed end thereof a coated textile from the take-off end of the doctor blading apparatus and to discharge the cured coated textile to a take-up reel located downstream therefrom.

A bolt of tightly woven 3 ounce/yd.$^2$ nylon cloth having a thickness of about 8 mils is treated utilizing the above-described apparatus. The basecoat formulation of Example 3 is fed to the first and second doctor blading stations, the doctor blades thereof each being set at a spacing of 2–3 mils above the cloth surface. The delivery rate of the basecoat coating formulation to each of the doctor blading stations is metered to provide a coating weight of between 1 and 1.5 ounces basecoat/yd$^2$ of cloth. The topcoat formulation of Example 5 is fed to the third doctor blading station, the doctor blade of this station being set to a spacing of 2–3 mils above the basecoat coated cloth surface and the rate of delivery of the topcoat formulation being metered to provide a coating weight of between 1 and 1.5 ounces of the topcoat formulation/yd$^2$ of cloth. After passing through the last of the solvent flashing and recovery stations the thusly multiply coated cloth is passed through the curing oven maintained at a temperature of about 325° F., the residence time of the cloth therein being controlled by the take-up reel to between 1 and 2 minutes. After passing from the curing oven and, prior to being taken up on the take-up reel, the bottom or uncoated side of the cloth is treated with a water repelling fluorocarbon composition such as that marketed under the brand name ZEPEL (E.I. du Pont de Nemours & Company, Wilmington, Del.).

Upon visual inspection, the cured polyurethane coating is noted to be smooth, uniform an devoid of structural defects. Attempts to strip the coating from the cloth reveal that the coating is strongly adherent to the nylon fabric substrate, the mode of failure, when achieved at all, tending to be in the nature of failure in cohesion rather than adhesion. Specimens of the coated cloth are subjected to waterproofness and moisture vapor transmission tests. Waterproofness is assessed by use of the Mullin's Burst Test (Fed. Std. 191, Method 5512) and failure of the coated textile occurs at an average hydrostatic pressure of about 120 p.s.i. Moisture vapor transmission rate is determined by the Upright Cup Test Method of ASTM-E96-66B and is found to be within the range of 500-600 gms/m$^2$/24 hours. However, the upright cup method of ASTM-E96-66B is considered by those of skill in the art to be deficient in determining high range moisture vapor transmission rates due, in large part, to the fact that the test inherently places an interfering air gap between the bulk water contained in the upright cup and the test material sealed to the mouth of the cup. Moreover, where the specimen is a fabric believed to have utility in applications wherein direct contact thereof with bulk water is anticipated, the Upright Cup method does not simulate such a direct wetting condition. Accordingly, it is conventional practice to test specimens believed to possess high water vapor transmission rate capabilities by means of a modified test wherein the specimen is sealed to the mouth of the upright cup containing the charge of water and the cup then inverted in order to avoid altogether the air gap between specimen and water charge and to thereby place the bulk water in direct contact with the specimen material. The coated textile of this example is also tested by this inverted cup modification of the ASTM-E96-66B method and the moisture vapor transmission rate thereof is found to be within the range of 6000 to 7000 gms/m$^2$/24 hours. In handling of the coated textile it is noted that the hand and stiffness thereof is little changed, if at all, from that of the uncoated cloth. From the foregoing results, it is apparent that the coated textile of the present example would make an excellent shell material for waterproof garments or other waterproof textile applications wherein water vapor transmissibility, as well as waterproofness, are essential or desirable traits.

EXAMPLE 8

Preparation of Fabric Laminate Comprising Breathable Waterproof Basecoat Sandwiched Between Fabric Layers A doctor blading line similar to that employed in the previous example is utilized. However, interposed between the take-off end of the doctor blading trough and the curing oven are a nip roll and, in opposition thereto, a calendering roll equipped with pressure adjustment means by which to adjust the pressure of the one roll against the other. In addition, a second feed reel is stationed upstream of the calender and nip rolls, thereby to provide means by which a second cloth may be applied to the coated cloth entering the calender and nip rolls.

The textiles employed in this example are each a tightly woven 3 oz/yd$^2$ nylon cloth. The cloth fed by the first feed reel through the coating line is coated at the first station and recoated at the second station with the basecoat polyurethane formulation of Example 4, the coating delivery rates at each station being metered at 0.4 to 0.5 oz/yd$^2$. At the third coating station the basecoat coated cloth is overcoated with the adhesive formulation of Example 6 which has been freshly promoted by admixture thereof with 3 parts by weight/100 parts of the adhesive solution of a crosslinker polyisocyanate such as MONDUR CB-75 (Miles, Inc., Pittsburgh, Pa.) or its equivalent. The promoted adhesive formulation is delivered to the basecoated cloth at a rate of about 0.3 oz/yd$^2$ and is doctor bladed at the third coating station to a thickness of about 2 wet mils. After passing the third solvent flashing station, the second cloth from the second feed roll is applied to the adhesively coated upper surface of the first textile and both are passed through the nip of the opposed nip and calender rolls under a roll pressure of several tons, thereby to effect continuous laminating contact of the second cloth to the adhesively coated surface of the first cloth and, further, to cause sufficient intermingling of the polytetramethylene ether glycol based adhesive formulation with the poly(oxyethylene) glycol and reactive polydimethylsiloxane based basecoat formulation such that an intermediate composition falling within the compositional parameters of the invention is formed therebetween. The resulting cloth laminate is then passed through the curing oven held at a temperature of about 350° F. and at a residence time of between about 1 and 2 minutes.

Specimens of the cloth laminate are tested for waterproofness and moisture vapor transmission rate (MVTR) in accordance with the Mullin's Burst Test Procedure of Federal Standard 191, Method 5512 and ASTM-E96-66B, respectively. The average burst strength is determined to be 150 p.s.i. and the average MVTR is determined to be 500 gms/m$^2$/24 hours. On the bases of these waterproofness and MVTR values, the laminated cloth product of this example is assessed as suitable for use as a material of construction of rain protective garments and in other textile applications wherein the qualities of waterproofness and water vapor transmissibility are necessary or desirable.

The foregoing description and examples are illustrative in character and demonstrate certain embodiments and techniques for implementation and use of the present invention. It should be recognized and understood, however, that said description and examples are not to be construed as limiting of the invention because many changes, modifications and variations may be made therein without departing from the scope, spirit or intention of the invention, as will be obvious to those skilled in the art.

What is claimed is:

1. A waterproof, water vapor transmissible fabric laminate comprising a pair of fabric layers laminated together by means of a polyurethane membrane interposed between and bonded to the opposing surfaces of said fabric layers, said polyurethane membrane comprising the reaction product of:
   (a) an organic polyisocyanate;
   (b) a polyalkylene ether glycol wherein the number of carbon atoms of the alkylene radical thereof is 2;
   (c) at least one polyalkylene ether glycol wherein the number of carbon atoms of the alkylene radical thereof is at least 3; and
   (d) an isocyanate reactive hydroxyl group-containing polydimethylsiloxane having a functionality of at least 2; the mole ratio of the polyalkylene ether glycol of (a) to the at least one polyalkylene ether glycol of (b) being within the range of from 1.5:0.5 to 0.5:1.5 and the mole ratio of said isocyanate reactive polydimethylsiloxane to the total of said polyalkylene ether glycols of (b) and (c) being within the range of from 0.1:1 to 0.3:1.

2. The fabric laminate of claim 1 wherein said mole ratio of said polyalkylene ether glycol of (a) to said at least one polyalkylene ether glycol of (b) is about 1:1.

3. The fabric laminate of claim 1 wherein each of said polyalkylene ether glycols of (a) and (b) has an average molecular weight of between about 450 and about 2000.

4. The fabric laminate of claim 1 wherein each of said polyalkylene ether glycols of (a) and (b) has a functionality of 2.

5. The fabric laminate of claim 1 wherein said polyalkylene ether glycol of (a) is poly(oxyethylene) glycol and said polyalkylene ether glycol of (b) is polytetramethylene ether glycol.

6. The fabric laminate of claim 1 wherein said polyisocyanate of (a) is a diisocyanate.

7. The fabric laminate of claim 1 wherein said isocyanate reactive hydroxyl group containing polydimethylsiloxane of (d) has an average molecular weight of between about 800 and about 3500.

8. The fabric laminate of claim 1 wherein said membrane is adhesively bonded to at least one of said fabric layers.

9. The fabric laminate of claim 1 wherein said membrane is adhesively bonded to at least one of said fabric layers by means of a water vapor transmissible adhesive.

10. The fabric laminate of claim 1 where at least one of said fabric layers is a non-woven fabric.

11. The fabric laminate of claim 1 wherein at least one of said fabric layers is a woven fabric.

* * * * *